United States Patent Office 3,632,743
Patented Jan. 4, 1972

3,632,743
BUCCAL- AND NASAL MUCOUS-ADMINISTERABLE PREPARATIONS HAVING AN ADRENOCORTICOTROPIC ACTIVITY
Leo Geller, Basel, Robert Deguillaume, Flueh, and Pierre Antoine Desaulles, Muttenz, Switzerland, assignors to Ciba Corporation, New York, N.Y.
No Drawing. Filed July 3, 1968, Ser. No. 742,174
Claims priority, application Switzerland, July 10, 1967, 9,774/67
Int. Cl. A61k 9/00, 17/06
U.S. Cl. 424—45
8 Claims

ABSTRACT OF THE DISCLOSURE

Pharmaceutical preparations of adrenocorticotropically active peptides which are suitable for resorption through the mucous membranes of the mouth or nose.

The present invention provides pharmaceutical preparations having an adrenocorticotropic activity which are suitable for resorption through the mucous membranes of the mouth or nose.

It has been found that adrenocorticotropically active peptides, such as the natural corticotropins and synthetic ACTH-active peptides, on administration through the mucous membranes of the mouth or nose, develop a good activity when used in the form of non-aqueous, especially oily, suspensions or solutions.

Therefore, the new preparations suitable for buccal or nasal administration are characterized in that they contain the ACTH-active peptides in the form of non-aqueous, especially oil, suspensions or solutions.

Suitable non-aqueous suspending agents or solvents are those which are pharmacologically acceptable and tolerated by the buccal and nasal mucous membranes, in the first place fatty acid esters, especially esters of saturated or unsaturated fatty acids, having a medium long or long chain, with monohydric or polyhydric alcohols such as ethanol, isopropanol, polyethyleneglycol, glycerol, hexitols, for example ethyloleate, isopropylmyristate, isopropylpalmitate, "Cetiol V" (oleic acid esters of liquid fat alcohols) or vegetable oils such as arachis oil, cotton seed oil, almond oil, olive oil, sesame oil or castor oil; or the triglyceride mixtures of fatty acids with 8 to 12 or 8 to 10 carbon atoms marketed under the trade names "Migliol 812" and "Labrafac WL 1349," and also mixtures of fatty acid esters of glycerol and of polyhydroxyethylene, for example "Labrafac WL 1219" and "Labrafil M 2735" (the latter is an oleic acid ester); or sorbitan fatty acid esters such as "Arlacel" or "Tween" (polyhydroxyethylenesorbitanmonooleate); furthermore long-chain hydrocarbons, for example "Cosbiol" (perhydro-squalene) and monohydric or polyhydric alcohols, for example ethanol, propyleneglycol, polyethyleneglycol, glycerol, benzyl alcohol or mixtures of the esters, hydrocarbons and/or alcohols, if desired with addition of emulsifiers.

With respect to the trademarked items mentioned above, note the following further identification and information:

"Cetiol V" is oleic acid decyl ester, cf. Oesterreichisches Arzneibuch IX, 1960. Producer: Henkel Internat, GmbH, Düsseldorf, Germany.

"Miglyol 812" is a mixture of triglycerides of saturated fatty acids having a chain length from 8 to 12 carbon atoms, cf. Extra Pharmacopoe Martindale, 25th Edition (1968), p. 899. Producer: Chemische Werke Witten, Witten/Ruhr, Germany.

"Labrafil M 2735" is polyoxyethylene-glycerol trioleate, cf. Pharmacopoe Francaise, 8th Edition, p. 524; U.S. Pat. 3,288,824. Producer: Gattefossé SFPA, Paris.

"Labrafac WL 1349" is a mixture of triglycerides of saturated fatty acids having a chain length from 8 to 10 carbon atoms. Producer: Gattefossé SFPA, Paris.

"Labrafac WL 1219" is a mixed ester of glycerol and polyoxyethylene with fatty acids having a chain length of 8 to 10 carbon atoms. Producer: Gattefossé SFPA, Paris.

"Arlacel" is sorbitan mono fatty acid ester and "Tween" is polyoxyethylene mono fatty acid ester; Arlacel or Tween 20 is the laureate, Arlacel or Tween 40 is the palmitate, Arlacel or Tween 60 is the stearate and Arlacel or Tween 80 is the oleate.

As ACTH-active peptides there may be mentioned the natural adrenocorticotropic hormones, for example $\beta$-corticotropin, and ACTH-active synthetic peptides having a shorter aminoacid chain which may be varied insofar as individual aminoacids are concerned, and also derivatives, salts and complexes of these peptides.

Synthetic ACTH-active peptides are, for example those which contain at least 16, preferably 18 to 28, aminoacids reckoned from the amino-end of $\beta$-corticotropin and may have a different sequence of some aminoacids. Thus, especially one or more of the aminoacids 1–5, 17, 18 and 25 may be replaced by aminoacids other than those corresponding to the natural sequence, for example the serine residues serine$^1$ and/or serine$^3$ by glycine or alanine; tyrosine$^2$ by phenylalanine; methionine$^4$ by norvaline, leucine, norleucine or $\gamma$-aminobutyric acid; glutamic acid$^5$ by glutamine; arginine $^{17,18}$ by ornithine$^{17,18}$ or lysine$^{17,18}$; the aminoacid$^{25}$ by valine. Serine$^1$ may also be replaced by proline, threonine or other aminoacids or it may be absent, or further aminoacid residues may precede it.

The new preparations preferably contain ACTH-active pepitides the first aminoacid of which has the D-configuration, that is to say, for example, D-alanine, D-proline, D-threonine or primarily D-serine.

ACTH-active pepitides suitable for the preparations are for example

D-Ser$^1$-corticotropin-Arg$^{18}$-amide,
D-Ser$^1$-Orn$^{17,18}$-$\beta^{1-18}$-corticotropin-Orn$^{18}$-amide,
D-Ser$^1$-Gly$^3$-Lys$^{17,18}$-$\beta^{1-18}$-corticotropin-Lys$^{18}$-amide,
D-Ser$^1$-Nle$^4$-Lys$^{17,18}$-$\beta^{1-18}$-corticotropin-Yys$^{18}$-amide,
D-Ser$^1$-Lys$^{17,18}$-$\beta^{1-18}$-corticotropin,
$\beta^{1-19}$-corticotropin,
D-Ser$^1$-$\beta^{1-19}$-corticotropin,
$\beta^{1-19}$-corticotropin-Pro$^{19}$-amide,
Glu(NH$_2$)$^5$-$\beta^{1-19}$-corticotropin,
D-Ser$^1$-Lys$^{17,18}$-Val$^{19}$-$\beta^{1-19}$-corticotropin-Val$^{19}$-amide,
D-Ser$^1$-Nle$^4$-Lys$^{17,18}$-Val$^{19}$-$\beta^{1-19}$-corticotropin-Val$^{19}$-amide,
$\beta^{1-20}$-corticotropin-Val$^{20}$-amide,
D-Ser$^1$-$\beta^{1-20}$-corticotropin-Val$^{20}$-amide,
D-Ser$^1$-Lys$^{17,18}$-$\beta^{1-20}$-corticotropin-Val$^{20}$-amide,
$\alpha$-aminobutyryl$^4$-Glu(NH$_2$)$^5$-$\beta^{1-20}$-corticotropin-Val$^{20}$-amide,
D-Ser$^1$-Lys$^{17,18}$-$\beta^{1-19}$-corticotropin-Pro$^{19}$-amide,
$\alpha$-aminobutyryl$^4$-$\beta$-1-$^{20}$-corticotropin-Val$^{20}$-amide,
$\beta^{1-21}$-corticotropin,
D-Ser$^1$-Lys$^{17,18}$-$\beta^{1-21}$-corticotropin-Lys$^{21}$-amide,
D-Ser$^1$-Lys$^{17,18}$-$\beta^{1-22}$-corticotropin-Val$^{22}$-amide,
$\beta^{1-23}$-corticotropin,
$\beta^{1-23}$-corticotropin-Tyr$^{23}$-amide,
D-Ser$^1$-$\beta^{1-23}$-corticotropin-Tyr$^{23}$-amide
D-Ser$^1$-Ala$^3$-$\beta^{1-23}$-corticotropin-Tyr$^{23}$-amide,
Gly$^1$-$\beta^{1-23}$-corticotropin-Tyr$^{23}$-amide,
D-Ser$^1$-Lys$^{17,18}$-$\beta^{1-23}$-corticotropin-Tyr$^{23}$-amide,
$\beta^{1-24}$-corticotropin-Glu(NH$_2$)$^5$-$\beta^{1-24}$-corticotropin,
D-Ser$^1$-Orn$^{17,18}$-$\beta^{1-24}$-corticotropin,
Gly$^{1,3}$-$\beta^{1-24}$-corticotropin,
Orn$^{17,18}$-$\beta^{1-24}$-corticotropin,
Lys$^{17,18}$-$\beta^{1-24}$-corticotropin,
D-Ser$^1$-Nle$^4$-$\beta^{1-24}$-corticotropin,
D-Ser$^1$-$\beta^{1-24}$-corticotropin, D-Ala$^1$-$\beta^{1-24}$-corticotropin,
D-Ser$^1$-Gly$^3$-Lys$^{17,18}$-$\beta^{1-24}$-corticotropin,
D-Ser$^1$-Nle$^4$-Lys$^{17,18}$-$\beta^{1-24}$-corticotropin-Pro$^{24}$-amide,
D-Ser$^1$-Orn$^{17,18}$-$\beta^{1-24}$-corticotropin-Pro$^{24}$-amide,
D-Ser$^1$-Nle$^4$-Orn$^{17,18}$-$\beta^{1-24}$-corticotropin-Pro$^{24}$-amide,
D-Ser$^1$-Gly$^3$-Lys$^{17,18}$-$\beta^{1-24}$-corticotropin-Pro$^{24}$-amide,
D-Ser$^1$-Lys$^{17,18}$-$\beta^{1-24}$-corticotropin,
D-Ser$^1$-Lys$^{17,18}$-$\beta^{1-24}$-corticotropin-Pro$^{24}$-amide,
D-Ser$^1$-Nle$^4$-Val$^{25}$-$\beta^{1-25}$-corticotropin-Val$^{25}$-amide,
D-Ser$^1$-Nle$^4$-D-Val$^{25}$-$\beta^{1-25}$-corticotropin-D-Val$^{25}$-amide,
D-Ser$^1$-Nva$^4$-Lys$^{17,18}$-Val$^{25}$-$\beta^{1-25}$-corticotropin-Val$^{25}$-amide,
D-Ser$^1$-Nle$^4$-Lys$^{17,18}$-Val$^{25}$-$\beta^{1-25}$-corticotropin-Val$^{25}$-amide,
Nle$^4$-Val$^{25}$-$\beta^{1-25}$-corticotropin-Val$^{25}$-amide,
Nva$^4$-Val$^{25}$-$\beta^{1-25}$-corticotropin-Val$^{25}$-amide,
Nle$^4$-Lys$^{17,18}$-Val$^{25}$-$\beta^{1-25}$-corticotropin-Val$^{25}$-amide,
$\beta^{1-26}$-corticotropin,
$\beta^{1-28}$-corticotropin,
$\beta^{1-30}$-corticotropin,
$\beta^{1-31}$-corticotropin,
$\beta^{1-39}$-corticotropin,
D-Ser$^1$-$\beta^{1-39}$-corticotropin,
Gly$^1$-$\beta^{1-39}$-corticotropin.

Special mention is deserved by D-Ser$^1$-Lys$^{17,18}$-$\beta^{1-18}$-corticotropin-Lys$^{18}$-amide.

The derivatives are above all amides, especially C-terminal amides whose amide group is unsubstituted.

Particularly suitable salts of the adrenocorticotropically active peptides are the acid addition salts of therapeutically acceptable acids such as hydrochloric, acetic, sulphuric, methanesulphonic acid, and fatty acids having a long carbon chain, for example capric, myristic, palmitic, stearic or oleic acid.

Suitable complexes are those with inorganic or organic substances which are capable of prolonging the activity of the peptides, for example complexes with sparingly soluble zinc compounds such as zinc hydroxide and/or zinc phosphate, with alkali metal polyphosphates, with oxypolygelatin, with polyphenols or polyalcohols, above all polyphloretine phosphate and phytic acid and also with polymers of aminoacids such as protamine and polyglutamic acid.

The peptides, their derivatives, salts or complexes can be administered in the form of suspensions or solutions. They are advantageously used in the form of sprays or aerosols, preferably with a propellant gas. Suitable propellant gases are above all pharmacologically useful halogenated hydrocarbons for example the products known by the trade name "Freon," such as "Freon 11" (trichlorofluoromethane), "Freon 12" (dichlorodifluoromethane) or "Freon 114" (dichlorotetrafluoroethane) or mixtures thereof.

The pharmaceutical preparations may further contain assistants such as preserving, stabilizing, wetting or emulsifying agents.

The following examples illustrate the invention:

EXAMPLE 1

0.25 gram of finely ground $\beta^{1-24}$-corticotropin (grain size below 5.0$\mu$) is suspended in a mixture of 3.5 ml. of "Miglyol 812" and 0.08 g. of benzyl alcohol. This suspension is charged into a container with dosing valve. Then 0.5 ml. of "Freon 12" are pressed through the valve into the container. The "Freon" is caused to dissolve in the Miglyol+benzyl alcohol mixture by agitation. This spray-container contains about 100 doses.

EXAMPLE 2

30 mg. of finely ground D-Ser$^1$-Lys$^{17,18}$-$\beta^{1-18}$-corticotropin-Lys$^{18}$-amide (cf. Indian Patent Application No. 102,799/65) are suspended in a mixture of 75 mg. of benzyl alcohol and 1.395 g. of "Miglyol 812." The suspension is filled into a 10 ml. aluminium monoblock container which is then closed with a dosing valve. After that, 6.0 g. of Freon 12/114 (40:60) are pressed in under nitrogen. The aluminium container with a content of 7.5 g. contains 100 doses of 0.3 mg. of peptideamide. The valve is so adjusted that if it is pressed once, a single dose is released.

Other nasal sprays are prepared in the same manner. Instead of "Miglyol," they contain the same quantity of isopropylmyristate or isopropylpalmitate or "Labrafac WL 1219" (a mixture of glycerol- and polyoxyethylene glycol esters of fatty acids with 8 or 10 carbon atoms).

EXAMPLE 3

In a manner similar to that described in Example 2, a spray container for 100 doses is prepared. It contains:

| | Mg. |
|---|---|
| D-Ser$^1$-Lys$^{17,18}$-$\beta^{1-18}$-corticotropin-Lys$^{18}$-amide | 100 |
| Benzyl alcohol | 75 |
| Miglyol or an ester mentioned in Example 2 | 1325 |
| Freon 12/114 (40:60) | 6000 |

EXAMPLE 4

In a manner similar to that described in Example 2, a nasal spray container for 100 doses is prepared. It contains:

| | G. |
|---|---|
| D-Ser$^1$-Lys$^{17,18}$-$\beta^{1-18}$-corticotropin-Lys$^{18}$-amide | 0.010 |
| Benzyl alcohol | 0.075 |
| Miglyol or an ester mentioned in Example 2 | 1.415 |
| Freon 12/114 (40:60) | 6.0 |

EXAMPLE 5

In the manner described in Examples 1 to 4, nasal sprays are prepared which instead of the benzyl alcohol contain another 0.075 g. of the ester mentioned.

EXAMPLE 6

A solution of 10.0 mg. of $\beta^{1-24}$-corticotropin stearate in 1.0 ml. of absolute ethanol is mixed with 3.5 ml. of "Labrafac 1219" and poured into a container with dosing valve. Then 6.5 ml. of "Freon 12/114" (at the ratio of 40:60) are pressed through the valve into the container, and the "Freon" is caused to dissolve in the alcohol+Labrafac mixture by agitation.

What is claimed is:

1. A pharmaceutical preparation in the form of an aerosol suitable for resorption through the mucous membranes of the mouth or nose comprising (1) a propellant gas and (2) an effective amount of an adrenocorticotropically active peptide in the form of an non-aqueous suspension or solution, wherein the suspending agent or solvent is selected from the group consisting of vegetable oils; triglyceride mixtures of fatty acids; mixtures of fatty acid esters of glycerol and polyhydroxyethylene; sorbitan fatty acid esters; and mixtures of said materials.

2. A pharmaceutical preparation as claimed in claim 1 which contains a solution or suspension of an adrenocorticotropically active peptide in a fatty acid ester.

3. A pharmaceutical preparation as claimed in claim 1 which contains a solution or suspension of an adrenocorticotropically active peptide in one or more members selected from the group consisting of a fatty acid ester of glycerol and a fatty acid ester of polyoxyethylene.

4. A pharmaceutical preparation as claimed in claim 1 which contains a solution or suspension of an adrenocorticotropically active peptide in a triglyceride mixture of fatty acids having a chain length of about 8 to 12 carbon atoms.

5. A pharmaceutical preparation as claimed in claim 1 containing a halogenated hydrocarbon as propellant gas.

6. A pharmaceutical preparation as claimed in claim 1 containing fluorine- and chlorine-substituted methane or fluorine- and chlorine-substituted ethane as propellant gas.

7. A pharmaceutical preparation as claimed in claim 1 containing as adrenocorticotropically active peptide D-

Ser$^1$-Lys$^{17,18}$-β$^{1-18}$-corticotropin-Lys$^{18}$-amide or a nontoxic acid addition salt thereof.

8. A nasal spray as claimed in claim 1 containing as adrenocorticotropically active peptide D-Ser$^1$-Lys$^{17,18}$-β$^{1-13}$-corticotropin-Lys$^{18}$-amide or a nontoxic acid addition salt thereof.

References Cited
UNITED STATES PATENTS

| | | | |
|---|---|---|---|
| 3,069,319 | 12/1962 | Stearns et al. | 424—45 |
| 3,169,095 | 2/1965 | Thiel et al. | 424—179 |
| 3,192,114 | 6/1965 | Hogberg et al. | 424—179 |
| 3,479,333 | 11/1969 | Greven | 260—112.5 |
| 3,483,291 | 12/1969 | Vogel et al. | 424—179 |

FOREIGN PATENTS

| | | | |
|---|---|---|---|
| 1,046,523 | 10/1966 | Great Britain | 424—179 |

ALBERT T. MEYERS, Primary Examiner

D. M. STEPHENS, Assistant Examiner

U.S. Cl. X.R.

424—179